United States Patent [19]

Mitchell

[11] 4,166,171
[45] Aug. 28, 1979

[54] RECOVERY OF SYNTHETIC POLYMER FROM SOLVENTS

[75] Inventor: Robert F. Mitchell, Youngstown, N.Y.

[73] Assignee: The Goodyear Tire & Rubber Company, Akron, Ohio

[21] Appl. No.: 919,003

[22] Filed: Jun. 26, 1978

Related U.S. Application Data

[63] Continuation of Ser. No. 533,048, Dec. 16, 1974, abandoned.

[51] Int. Cl.² .............................................. C08F 6/12
[52] U.S. Cl. .................................. 528/488; 260/30.2; 260/30.4 R; 260/32.6 R; 260/33.6 UA; 528/491; 528/496
[58] Field of Search ........................ 528/488, 491, 496

[56] References Cited

U.S. PATENT DOCUMENTS

| 2,389,958 | 11/1945 | Crawford et al. | 260/88 |
| 2,592,814 | 4/1952 | Ludlow | 260/79.3 |
| 3,434,523 | 3/1969 | Ceausescu et al. | 159/47 |
| 3,553,186 | 1/1971 | Schnoring et al. | 260/94.7 |
| 3,590,026 | 6/1971 | Carlson et al. | 260/94.7 |

Primary Examiner—Stanford M. Levin
Attorney, Agent, or Firm—J. P. Ward

[57] ABSTRACT

This invention concerns a method for the removal and recovery of synthetic polymers from solvents using dropwise impingement of a solution of the polymer in a solvent upon a mobile capillary inactive liquid surface to volatilize and recover the solvent, leaving the previously dissolved synthetic polymer on the surface of the capillary inactive liquid. The solvent is recovered by condensation for reuse and the polymer is recovered from the surface of the liquid by mechanical means.

4 Claims, 1 Drawing Figure

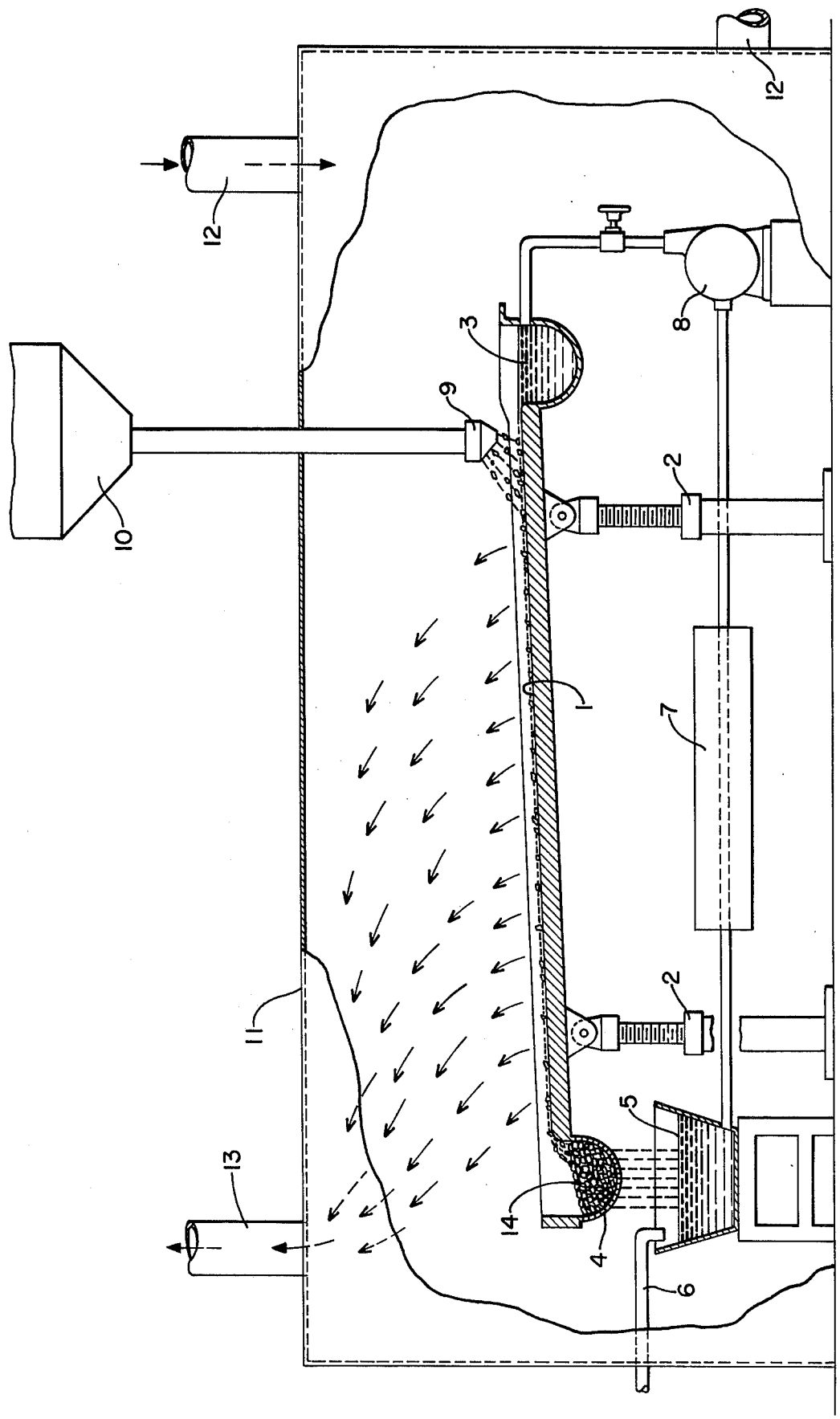

RECOVERY OF SYNTHETIC POLYMER FROM SOLVENTS

This is a continuation of application Ser. No. 533,048 filed Dec. 16, 1974, now abandoned.

This invention relates to removal of synthetic polymers from solvents and to a process for recovery of the solvent and the polymer.

Solvents have long been used to remove polymer build-up on interior surfaces of synthetic polymer reactors. Solvents dissolve the polymer from all surfaces and require only minimum use of manual labor. Solvent expenses have been lessened by distilling the solvent after use, dehydrating if necessary, and reusing as a cleaning solvent.

Polymer dissolved in these solvents is left behind in the distillation apparatus as the solvent is recovered for reuse. Such polymer is usually in the form of a sticky mass which clogs the solvent recovery apparatus and has little or no value. Removal of such polymeric material requires equipment downtime with attendant expenses as well as final disposition of the polymeric residue.

It is therefore an object of the present invention to provide a method for recovering polymer from reactor cleaning solvents. Other objects will become apparent to those skilled in this art as the description proceeds.

It has now been discovered that synthetic polymers can be recovered from solvents by impinging a solution of the synthetic polymer dissolved in the solvent on the surface of a capillary inactive liquid. The capillary inactive liquid is maintained at a temperature sufficient to volatilize the solvent and leave behind discrete, solvent free masses of the previously dissolved synthetic polymer. Control of size and structure of the masses is provided by adjustment of operational parameters.

High surface free energy at the interface between two immiscible liquids affects contraction of the residual solute (dissolved polymer) mass after volatilization of its solvent if the free surface energy (surface tension) of the non-volatile liquid is sufficient. For example, inorganic electrolytes, low molecular weight bases and certain non-volatile, non-electrolytes such as sugars and glycerines are able to affect or sustain in aqueous solution a surface tension which is slightly higher than that of pure water at any specific temperature below the boiling point. These solutions are known as capillary inactive solutions.

In the preferred embodiment, small droplets of the solvent containing dissolved polymer are impinged upon the surface of a continuously moving capillary inactive liquid layer which travels a distance sufficient for the complete volatilization of the solvent and leaves the previously dissolved polymer on the surface of the liquid. The liquid flowing down an inclined plane is similar to a liquid conveyor belt, allowing the solid polymer to be recovered at the downstream end.

Representative examples of capillary inactive liquids useful in the practice of the present invention are low molecular weight alkalies such as aqueous sodium hydroxide and aqueous potassium hydroxide, aqueous saturated inorganic salt solutions such as magnesium sulfate and sodium chloride, aqueous glycerine mixtures, and aqueous carbohydrate solutions such as solutions of glycosides and saccharides. Representative examples of the synthetic polymers recoverable by the process of the present invention are vinyl chloride homopolymers and copolymers, styrene/butadiene, polyethylene and polypropylene polymers. Solvents useful in the practice of the present invention are generally tetrahydrofuran (THF) and aprotic solvents. Aprotic solvents are solvents which do not offer or accept protons. Representative examples of aprotic solvents are n-pyrrolidone, cyclohexane, benzene and dimethylformamide.

Invention parameters which interact to form a useful process are droplet temperature, composition and size; orifice size; choice of capillary inactive medium, temperature and velocity of the capillary inactive medium; spacing and length of travel of the droplet upon the liquid surface of the capillary inactive liquid; and atmospheric pressure above the capillary inactive liquid.

The invention is more concretely described with reference to the examples below wherein all parts and percentages are by weight unless otherwise specified. The examples involve the removal of polyvinylchloride (PVC) from tetrahydrofuran (THF) cleaning solvent by dropwise contact with a capillary inactive liquid. All experiments described were conducted as follows.

An apparatus was built for recovery of reactor cleaning solvents and the polymer dissolved therein utilizing the principle of the present invention. The apparatus can be more easily understood with reference to the drawing, wherein the inclined tray (1) containing the capillary inactive liquid is mounted on four leveling screws (2). The tray has an inlet sump (3) at the upper edge to insure uniform coverage of the inclined surface, and a basket weir (4) at the lower edge of the inclined plane to collect the solid polymer and allow the liquid to pass through into an outlet sump (5) located below the bed. The capillary inactive liquid is maintained at a set volume by addition (6) from a reserve supply. The capillary inactive liquid is passed through a heat exchanger (7) to maintain proper temperature and forced back to the inlet sump (3) by a pump (8). The solvent containing the dissolved polymer is pumped into the spray head manifold (9) which is supplied from a reservoir (10). The assembly is enclosed in a fume hood (11) containing a vacuum or inert gas inlet port (12) and an outlet port (13) leading to apparatus for condensation of the solvent. The previously dissolved polymer is recovered in a solid state in the basket weir (4) and removed at one end of the bed in a polymer discharge (14).

The drawing is exaggerated in some respects, such as the angle of incline of the bed and the size of the droplets and particles of polymer recovered, in order to show the operation of the apparatus.

Droplets of cleaning solvent containing dissolved polyvinylchloride polymer and maintained at room temperature were impinged upon the moving surface of various capillary inactive liquids. Spacing, size and path of droplets were controlled to produce individual pellets or flakes of non-tacky polymer residue after vaporization of the solvent. All droplets were at ambient temperature and were composed of tetrahydrofuran containing approximately 5 percent dissolved polyvinylchloride polymer. All droplets were approximately of 1/20 milliliter volume as formed by an orifice of 0.080 inch, and falling a distance of 3 inches to the surface of the capillary inactive liquid. The capillary inactive liquid flowed at an approximate surface speed of 50 inches per minute. The depth was approximately 0.25 inch and the total surface area was approxiamtely 12.5 square inches. Droplet impingement foci were on ½ inch centers. After vaporization the polymer was carried on the surface of the capillary inactive liquid to the lower end of the bed and deposited upon a screen having an aperture size capable of retaining the polymer mass produced. The capillary inactive medium, now free of polymer, was recycled and reused.

The entire apparatus was enclosed in a fume chamber at atmospheric pressure. The fume chamber was then evacuated to a partial vacuum in order to remove the volatiles from the chamber to the condenser for recovery and reuse. An inert gas such as nitrogen can also be used, keeping the system at atmospheric pressure and removing the need for a vacuum.

Examples 1 to 8 in Table I below illustrate the results that may be obtained with various capillary inactive liquids.

Table I

| Aqueous Medium | Temp. °C. | Droplet Evaporation Elapsed Time Seconds | Residual PVC Mass Character | Average Diameter mm |
|---|---|---|---|---|
| 1. 50% NaOH | 85 | 5 to 10 | Pellet | 3 |
| 2. Saturated MgSO₄ | 85 | 20 | Flake | 10 |
| 3. Saturated CaCl₂ | 85 | 20 | Flake | 10 |
| 4. Saturated Nacl | 85 | 40 | Flake | 12 |
| 5. Water | 85 | 30 | Coalescent Film | 20 |
| 6. Glycerine | 70 | 15 | Flake | 12 |
| 7. 50% Glycerine | 70 | 10 | Flake | 12 |
| 8. 10% Glycerine | 70 | 5 | Coalescent Flakes | 25 |

Of the capillary inactive liquids tested, aqueous sodium hydroxide produced the most compact polymer mass within 10 seconds. Aqueous glycerine within a concentration range of 10 to 50 percent glycerine, produced flakes having less density than the mass produced using sodium hydroxide, but had the advantage of a more rapid solvent volatilization than that experienced with sodium hydroxide, even when maintained at a lower solution temperature. The saturated solutions of electrolytes produced polymer flakes but excessive volatilization temperatures were required. Concentrations of polymer in the solvent from about 4 to about 9 percent are effective.

Experiments using the laboratory model indicate that adjustment of parameters would enable the system to be used at a higher processing rate. Such parameters would be slope of the inclined plane controlling the liquid flow, the temperature of the capillary inactive medium, the rate of the capillary inactive medium circulation, depth of the liquid in the bed, the rate of droplet feed, size of the droplet, ambient pressure above the capillary inactive liquid and the ambient temperature maintained in the vapor space of the recovery unit.

Although the disclosure is illustrated with respect to polyvinylchloride polymers and tetrahydrofuran solvent, the general principle can be applied to many combinations of solvent, and polymers for which a suitable capillary inactive liquid can be found.

While certain representative embodiments and details have been shown for the purpose of illustrating the invention, it will be apparent to those skilled in this art that various changes and modifications may be made therein without departing from the spirit or scope of the invention.

I claim:

1. A method of recovering synthetic vinyl polymer, in the form of discrete particles, from a reactor cleaning solvent consisting of (a) impinging droplets of a solution consisting of the synthetic vinyl polymer in the reactor cleaning solvent upon the surface of a continuously moving capillary inactive liquid selected from the group consisting of aqueous potassium hydroxide, aqueous sodium hydroxide, aqueous saturated sodium chloride, aqueous saturated magnesium sulfate, aqueous saturated calcium chloride and aqueous glycerine, said continuously moving capillary inactive liquid traversing an inclined plane, (b) maintaining said continuously moving capillary inactive liquid at a temperature sufficient to volatilize the solvent, (c) forming discrete particles of the polymer on the surface of the continuously moving capillary inactive liquid and (d) separating the discrete particles of polymer so formed on the surface of said continuously moving capillary inactive liquid from said liquid by mechanical means.

2. The method of claim 1 wherein the synthetic vinyl polymer is polyvinylchloride and the solvent is tetrahydrofuran and the process is carried out at a temperature of 70° C. to 85° C. at 1 atmosphere pressure.

3. The method of claim 1 wherein the solvent is an aprotic solvent selected from the group consisting of dimethylformamide, n-pyrrolidone, benzene and cyclohexane and wherein the method is carried out at less than atmospheric pressure.

4. The method of claim 1 wherein the vinyl polymer concentration in the solvent is from 4 to about 9 percent by weight.

* * * * *